United States Patent
Afzali-Ardakani et al.

(10) Patent No.: US 10,830,646 B2
(45) Date of Patent: Nov. 10, 2020

(54) MULTISPECTRAL PLASMONIC THERMAL IMAGING DEVICE

(71) Applicant: International Business Machines Corporation, Armonk, NY (US)

(72) Inventors: Ali Afzali-Ardakani, Ossining, NY (US); Abram L. Falk, Port Chester, NY (US); Damon B. Farmer, White Plains, NY (US); Shu-Jen Han, Cortlandt Manor, NY (US); George S. Tulevski, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/380,042

(22) Filed: Apr. 10, 2019

(65) Prior Publication Data
US 2019/0234800 A1 Aug. 1, 2019

Related U.S. Application Data

(62) Division of application No. 15/802,836, filed on Nov. 3, 2017.

(51) Int. Cl.
*G01J 5/00* (2006.01)
*G01J 5/04* (2006.01)
(Continued)

(52) U.S. Cl.
CPC .............. *G01J 5/0018* (2013.01); *G01J 5/023* (2013.01); *G01J 5/046* (2013.01); *G01J 5/0862* (2013.01);
(Continued)

(58) Field of Classification Search
CPC ...... G02B 5/008; G02B 6/1226; G02B 5/204; G01N 21/554
See application file for complete search history.

(56) References Cited

U.S. PATENT DOCUMENTS 5,900,942 A    5/1999  Spiering
7,723,684 B1   5/2010  Haddon et al.
(Continued)

OTHER PUBLICATIONS

"Strong and Broadly Tunable Plasmon Resonances in Thick Films of Aligned Carbon Nanotubes", Nano Letters (Aug. 1, 2017), 17, 5641-5645 to Chiu et al. (Year: 2017).*
Ali Afzali-Ardakani et al., "Multispectral Plasmonic Thermal Imaging Device," U.S. Appl. No. 16/380,046, filed Apr. 10, 2019.
List of IBM Patents or Patent Applications Treated As Related; Date Filed: Jul. 10, 2019, 2 pages.
(Continued)

*Primary Examiner* — Kenneth J Malkowski
(74) *Attorney, Agent, or Firm* — Cantor Colburn LLP; Anthony Curro (57) ABSTRACT

A computer-implemented method of forming a thermal-based electronic image of an object that includes receiving electromagnetic radiation emitted by the object at an optically sensitive layer including a superpixel having a plurality of pixels. Each pixel of the plurality of pixels includes a plasmonic absorber having a characteristic resonance wavelength and that generates a radiance measurement of the electromagnetic radiation at its characteristic resonance wavelength. The method further provides for determining, at a processor, an emissivity and temperature for the electromagnetic radiation received at the superpixel using the radiance measurements obtained at the pixels of the superpixel. In addition, the method provides for forming an image of the object from the determined emissivity and temperature.

19 Claims, 8 Drawing Sheets

(51) Int. Cl.
  *G01J 5/60* (2006.01)
  *G01J 5/08* (2006.01)
  *G01J 5/02* (2006.01)
  *G01J 5/20* (2006.01)

(52) U.S. Cl.
  CPC .............. *G01J 5/20* (2013.01); *G01J 5/602* (2013.01); *G01J 2005/0051* (2013.01); *G01J 2005/0074* (2013.01); *G01J 2005/0077* (2013.01)

(56) References Cited

U.S. PATENT DOCUMENTS

| | | | |
|---|---|---|---|
| 7,872,233 B2 | 1/2011 | Hu et al. | |
| 8,354,296 B2 | 1/2013 | Dimitrakopoulos et al. | |
| 8,389,939 B1* | 3/2013 | Stanley | B82Y 20/00 250/332 |
| 8,664,642 B1 | 3/2014 | Davis | |
| 8,941,203 B2 | 1/2015 | Wehner et al. | |
| 9,040,913 B2 | 5/2015 | Savoy et al. | |
| 9,214,604 B2 | 12/2015 | Ali et al. | |
| 9,547,107 B2 | 1/2017 | Guo et al. | |
| 2008/0251723 A1 | 10/2008 | Ward et al. | |
| 2015/0221796 A1 | 8/2015 | Smith et al. | |
| 2015/0276489 A1 | 10/2015 | Cumming et al. | |
| 2016/0033401 A1* | 2/2016 | Farmer | G01N 21/553 356/445 |
| 2017/0227797 A1 | 8/2017 | Long et al. | |
| 2019/0137341 A1 | 5/2019 | Afzali-Ardakani et al. | |
| 2019/0234801 A1 | 8/2019 | Afzali-Ardakani et al. | |

OTHER PUBLICATIONS

Chiu et al., "Strong and Broadly Tunable Plasmon Resonances in Thick Films of Aligned Carbon Nanotubes", NANO Letter, vol. 17, 2017; pp. 5641-5645.

Jang Woo-Yong et al., "Experimental Deminstration of Adaptive Infrared Multispectral Imaging using Plasmonic Filter Array", Scientific Reports, vol. 6, 2016; pp. 1-8.

Jang Woo-Yong et al., "Plasmonic Superpizel Sensor for Compressive Spectral Sensing", IEEE Transactions on Geoscience and Remote Sensing, vol. 53, No. 6, 2015; pp. 3471-3480.

V. J. Gokhale et al.; "Subwavelength plasmonic absorbers for spectrally selective resonant infrared detectors," Sensors, 2014, pp. 982-985.

Y. Hui et al.; "Plasmonic piezoelectric nanomechanical resonator for spectrally selective infrared sensing," Nature Communications, vol. 7, 2016, pp. 1-9.

List of IBM Patents or Patent Applictions Treated As Related; (Appendix P), 2 pages.

International Search Report for the corresponding PCT/IB2018/058527; International Filing Date Oct. 31, 2018; dated Feb. 13, 2019; 9 pages.

"Transparent metals: preparation and charcterizationof light-transmitting palladium, rhodium, and rhenium films", Journal of Electroanalytical Chemistry and Interfacial Electrochemistry vol. 228, Issues 1-2, Aug. 10, 1987, pp. 167-178, (Year: 1987).

Zhu W. (2012) Carbon Nanotube-Metal Contact. In: Bhushan B. (eds) Encyclopedia of Nanotechnology. Springer, Dordrecht, available at https://link.springer.com/content/pdf/10.1007%2F978-90-481-9751-4_113.pdf (Year: 2012).

* cited by examiner

MULTISPECTRAL PLASMONIC THERMAL IMAGING DEVICE

DOMESTIC PRIORITY

This application is a divisional of U.S. patent application Ser. No. 15/802,836, filed Nov. 3, 2017, the disclosure of which is incorporated by reference herein in its entirety.

BACKGROUND

The present invention relates to thermal imaging devices, and more specifically, to a thermal imaging device using plasmonic materials.

Thermographic cameras produce thermal images of objects in their field of view based on the temperature of the objects. Objects continuously emit electromagnetic radiation. The spectrum and intensity of the emitted electromagnetic radiation is a function of the temperature of the object. For an ideal, perfectly absorbing object (i.e., a "blackbody"), the emitted spectrum is described by Planck's law. For most objects however this spectrum flux is modified by the object's emissivity.

SUMMARY

Embodiments of the present invention are directed to a computer-implemented method of forming a thermal-based electronic image of an object. The method includes receiving electromagnetic radiation emitted by the object at an optically sensitive layer including a superpixel having a plurality of pixels, wherein each pixel of the plurality of pixels includes a plasmonic absorber having a characteristic resonance wavelength and that generates a radiance measurement of the electromagnetic radiation at its characteristic resonance wavelength; determining, at a processor, an emissivity and temperature for the electromagnetic radiation received at the superpixel using the radiance measurements obtained at the pixels of the superpixel; and forming an image of the object from the determined emissivity and temperature.

Embodiments of the present invention are directed to a computer-implemented method of forming a thermal-based electronic image of an object. The method includes receiving electromagnetic radiation emitted by the object at a layer of plasmonic material and generating radiance measurements of the electromagnetic radiation at a plurality of wavelengths. The method further includes determining, at a processor, an emissivity and temperature of the object from the radiance measurements and forming a thermal-based electronic image of the object from the determined emissivity and temperature.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a thermographic camera produces an image of an object based on the temperature of the object. Objects can be treated as blackbody radiators or "blackbodies" for thermographic imaging purposes. A blackbody is a perfectly opaque and non-reflective material. The thermal emission from a blackbody is given by Planck's law, which specifies that the power per unit wavelength $B_\lambda(\lambda,T)$ is given by:

$$B_\lambda(\lambda, T) = \frac{2hc^2}{\lambda^5} \frac{1}{\exp\left(\frac{hc}{\lambda k_B T}\right) - 1} \qquad \text{(Eq. 1)}$$

where $\lambda$ is the wavelength, h is Planck's constant, c is the speed of light, T is the temperature of the object, and $k_B$ is Boltzmann's constant. The curve drawn out by Planck's law peaks at a characteristic wavelength that is associated with a maximum temperature of the blackbody. Many objects however are not pure blackbodies and their emission is only a fraction of the emission of a blackbody. This fraction is known as the emissivity, and is defined as:

$$\varepsilon = A_\lambda(\lambda,T)/B_\lambda(\lambda,T) \qquad \text{(Eq. 2)},$$

where $A_\lambda(\lambda,T)$ is the emission of the object, and $B_\lambda(\lambda,T)$ is the emission of an ideal blackbody. Emissivities of materials can have a broad range of values from between an emissivity of 1 for a perfect absorber and an emissivity of 0 for a perfect reflector. For example, aluminum foil has an emissivity of 0.03, whereas water is almost an ideal black body, with an emissivity of 0.96. Due to the effect of emissivity, when using a single-wavelength thermographic camera, objects with different emissivities but identical temperatures can appear incorrectly on the camera to have different temperatures.

Embodiments of the present invention provides a thermal imaging device or thermographic camera for measuring both characteristic temperature and emissivity of an object using multi-spectral measurements. Embodiments of the invention employ plasmonic materials in the thermal imaging device in order to detect radiance levels at various wavelengths. Plasmonic materials include plasmonic absorbers which interact with electromagnetic fields to measure power levels at selected wavelengths of the electromagnetic radiation via plasmonic interaction. Surface plasmons are charge oscillations in materials coupled to the optical field or the electromagnetic field. Due to the strength of plasmonic interactions, plasmonic materials can strongly absorb light, even when the plasmonic materials are nanostructures whose size is significantly less than the free-space wavelength of light. Plasmon-resonance wavelengths correspond to peak absorption in a material as a function of optical wavelength. These plasmon resonance wavelengths are functions of the shape and/or size of the plasmonic material.

The thermal imaging device according to embodiments of the invention can include an array of pixels generally grouped together in a superpixel. Each pixel includes a plasmonic absorber that is sensitive to of the electromagnetic spectrum at an individual or characteristic wavelength of the plasmonic absorber and thus can be used to measure the radiance from an object at the selected wavelength. With each pixel of a superpixel responsive at its characteristic wavelength, a superpixel can generate radiance measurements for a plurality of wavelengths. These radiance measurements can be used to determine a radiance curve for electromagnetic radiation received at the superpixel. The determined radiance curve can be compared to a blackbody radiance curve having a same characteristic wavelength in order to determine an emissivity of the object and a temperature of the object. The temperature of the object can be used to provide a thermal image, or thermal-based electronic image, of the object.

Figure 1:
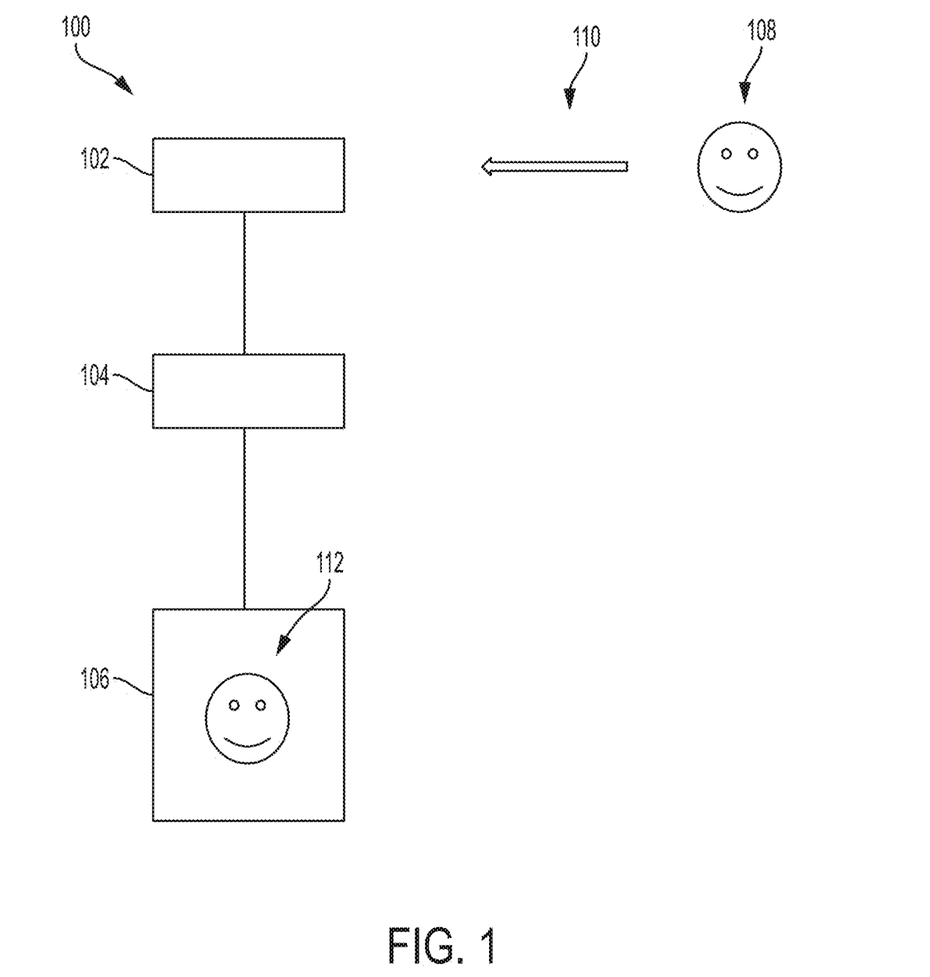
FIG. 1 shows a thermographic camera system according to embodiments of the present invention.

Referring now to FIG. 1, a thermographic camera system 100 is shown in embodiments of the present invention. The system 100 includes a thermographic camera 102 that receives electromagnetic radiation 110 emitted by an object 108. The electromagnetic radiation 110 includes thermal radiation such as radiation in an infrared region of the electromagnetic spectrum, including the far infrared radiation region. The thermographic camera 102 generates electrical signals that are indicative of radiance levels at one or more wavelengths in response to the electromagnetic radiation received from the object 108. The thermographic camera 102 provides these electrical signals to a processor 104. The processor 104 calculates temperatures for each of the electrical signals and assigns a color or other coding scheme for the determined temperatures. The color or coding scheme is provided to a display 106 in order to form a thermal image 112 of the object 108 at the display 106. In various embodiments, the thermographic camera 102 and the processor 104 can be provided as a single unit or device. In other embodiments, the thermographic camera 102, processor 104 and display 106 can be provided as in a single unit or device.

Figure 2:
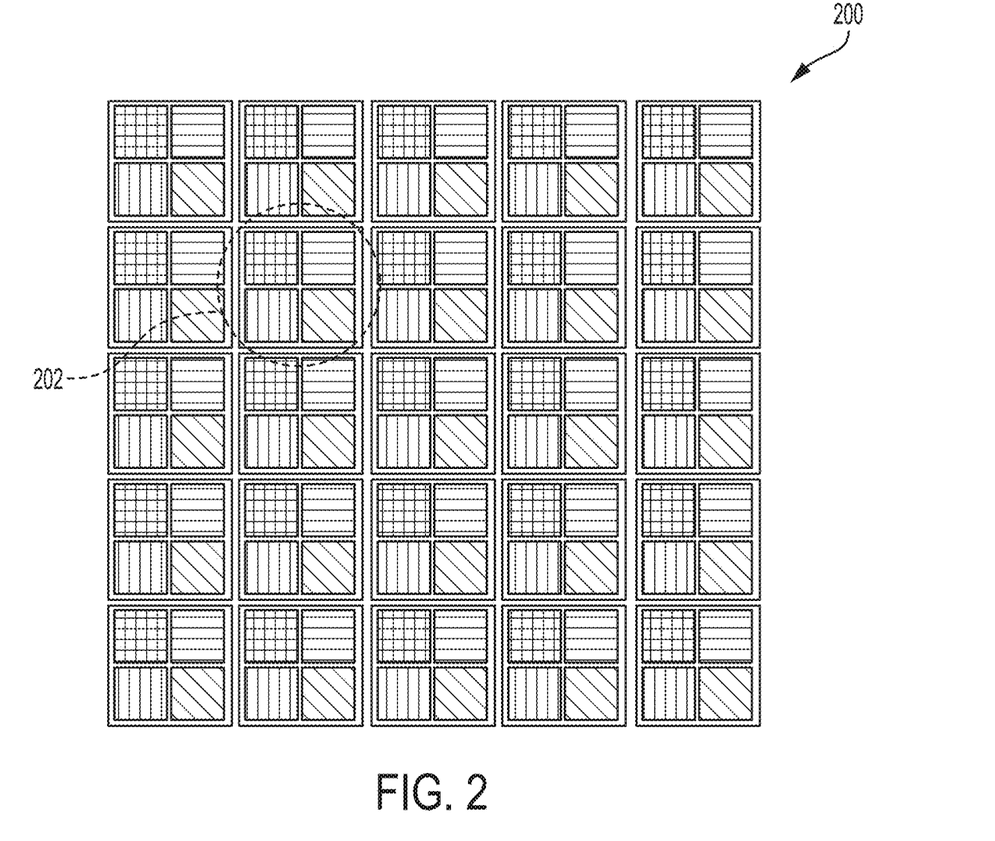
FIG. 2 shows a focal plane array that is included in the thermographic camera according to embodiments of the present invention in order to create a thermal image.

FIG. 2 shows a focal plane array 200 that is included in the thermographic camera 102 according to embodiments of the present invention in order to create a thermal image. The focal plane array 200 is an optically-sensitive layer of plasmonic material and includes a two-dimensional array of superpixels 202 which are used to obtain a thermal profile of the object 108. In the exemplary embodiment, the focal plane array 200 includes a 5×5 array of superpixels. However, it is to be understood that the focal plane array 200 is not limited to this number of superpixels and that, in various embodiments, the number of superpixels can number in the hundreds or thousands. An exemplary superpixel 202 has been circled for illustrative purposes and an expanded view of the superpixel 202 is shown in FIG. 3.

Figure 3:
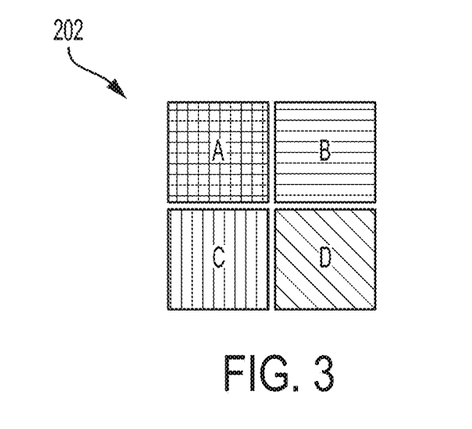
FIG. 3 shows a detailed view of an exemplary superpixel of the focal plane array of FIG. 2.

Referring to FIG. 3, the illustrative superpixel 202 of FIG. 2 includes four pixels, labelled A, B, C and D, that are arranged to form a square. The specific example of four pixels to a superpixel is not meant to be a limiting aspect of the invention and is shown for illustrative purposes only. In various embodiments, a superpixel can include any number of pixels. In addition, the shapes of the pixels and the superpixels, the geometric arrangement of the pixels within a superpixel and the geometric arrangement of the superpixels within the focal plane array can be any suitable shape and/or geometrical arrangement.

Each pixel (A, B, C, D) is sensitive to radiance levels at a particular wavelength of the electromagnetic spectrum. When a pixel (A, B, C, D) receives electromagnetic radiation at the wavelength (the "resonance wavelength") at which the pixel is sensitive, the pixel generates a signal indicative of a radiance level for the received electromagnetic radiation at the resonance wavelength, thereby providing a measurement of power at the resonance wavelength. In various embodiments, the resonance wavelength of each pixel (A, B, C, D) is different from the resonance wavelengths of the other pixels. In other words, $\lambda_A \neq \lambda_B \neq \lambda_C \neq \lambda_D$. Pixel A measures the radiance level $R_{\lambda_A}$ at a first wavelength $\lambda_A$, pixel B measures the radiance level $R_{\lambda_B}$ at a second wavelength $\lambda_B$, pixel C measures the radiance level $R_{\lambda_C}$ at a third wavelength $\lambda_C$, and pixel D measures the radiance level $R_{\lambda_D}$ at a fourth wavelength $\lambda_D$. The resonance wavelength of a pixel is a product of the materials and specifications of the pixel. These materials and specifications can be selected during manufacture of the pixel.

Figure 4:
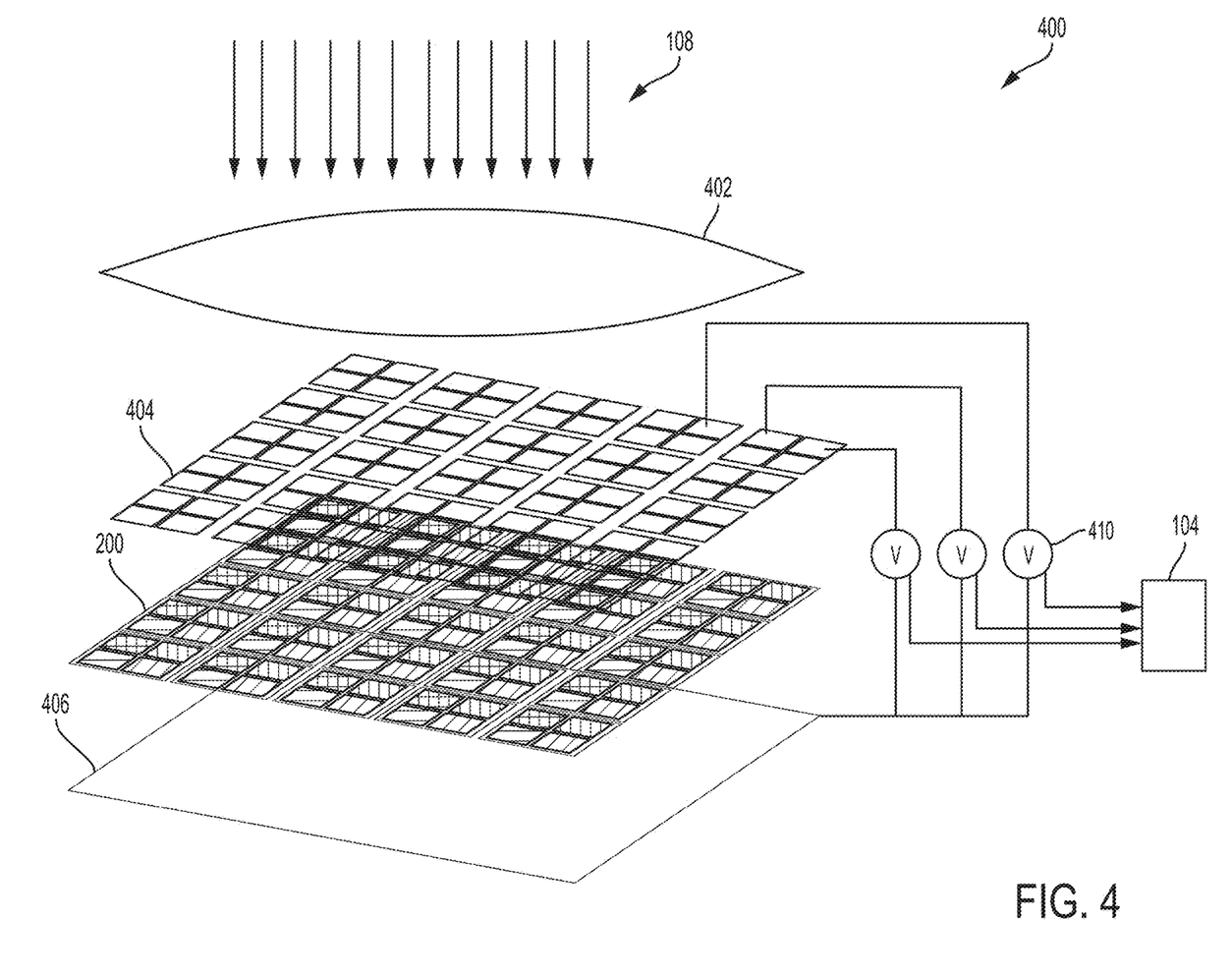
FIG. 4 shows a diagram of the components of the thermographic camera of FIG. 1 in an embodiment of the present invention.

FIG. 4 shows a diagram of the components of the thermographic camera 102 of FIG. 1 in one embodiment of the present invention. The thermographic camera 102 includes the focal plane array 200 of FIGS. 2 and 3. The focal plane array 200 is disposed at a focal plane of lens 402 which directs the electromagnetic radiation 110 from object 108 onto the focal plane array 200. The focal plane array 200 is disposed or located between a top contact layer 404 and a bottom contact layer 406. The top contact layer provides an array of electrodes to a top side of the focal plane array 200, and the bottom contact layer 406 provides an array of electrodes to a bottom side of the focal plane array 200. The top contact layer 404 can be made of a first metal while the bottom contact layer 406 can be made of a second metal in order that the top contact layer 404 and the bottom contact layer 406 have different work functions. In various embodiment, the first metal is palladium while the second metal is titanium.

Each pixel of the focal plane array 200 is coupled to an electrode of the top contact layer 404 and an electrode of the bottom contact layer 406 in order to provide an electrical path between these electrodes. The electrodes connect the pixel to a sensor 410. In various embodiments, the sensor is a voltmeter. As the pixel receives electromagnetic radiation directed onto it by lens 402, a potential difference is created between the top electrode and bottom electrode of the pixel. The potential difference is indicative of a radiance level of the received electromagnetic radiation at the resonance wavelength of the pixel. The voltmeter measures this potential difference by generating an electrical signal indicative of the potential difference and transmits the electrical signal to the processor 104. For a selected superpixel, the processor 104 receives electrical signals from the plurality of pixels of the superpixel, thereby receiving measurements of radiance levels at a plurality of wavelengths.

Figure 5:
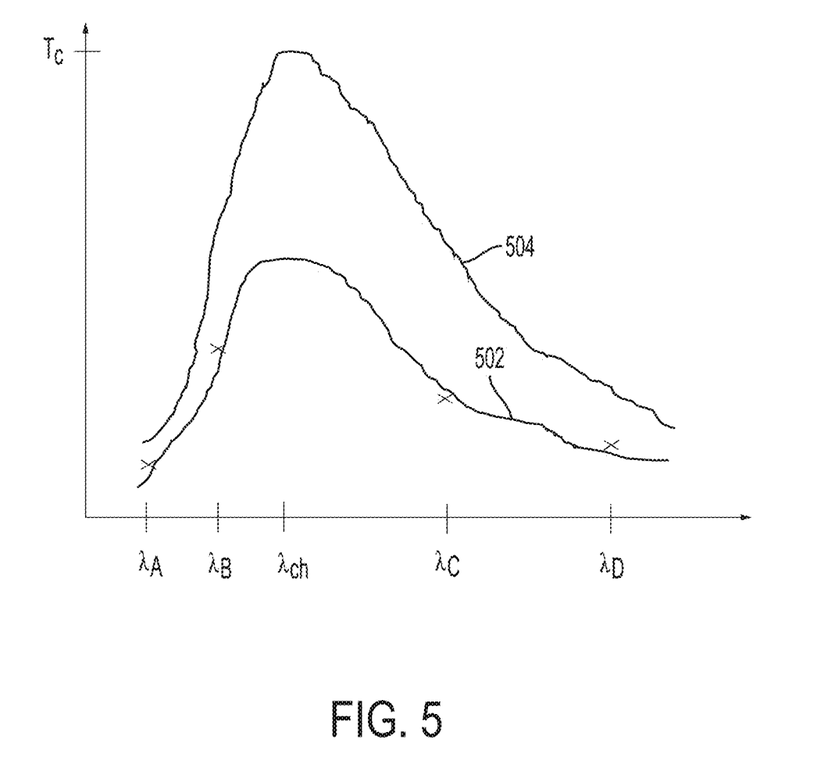
FIG. 5 shows radiance curves related to blackbody radiation from an object a different emissivities and illustrates a process by which a temperature of the object is determined at a superpixel from the measurements obtained at pixels of the superpixel.

FIG. 5 illustrates a process by which a temperature of the object 108 is determined at a superpixel from the measurements obtained from pixels of the superpixel. Wavelength is shown along the abscissa and power is shown along the ordinate. The radiance measurements for a selected superpixel are shown plotted against their corresponding wavelengths. The processor 104 constructs a curve that provides a best fit of the radiance measurements of the superpixel to an equation (or curve) of Planck's Law using regression analysis or other suitable curve-fitting method in order to obtain an emission curve $A_\lambda(\lambda,T)$ 502 representative of electromagnetic radiation at the superpixel. The processor 104 then determines the characteristic wavelength $\lambda_{ch}$ of the emission curve $A_\lambda(\lambda,T)$ 502. The emission curve $A_\lambda(\lambda,T)$ 502 for the superpixel can be compared to a blackbody spectrum curve $B_\lambda(\lambda,T)$ 504 having the same characteristic wavelength in order to obtain an emissivity corresponding to the received radiation and a blackbody temperature for the received radiation at the superpixel.

Repeating this process for each superpixel, the processor 104 therefore determines a blackbody temperature for each of the superpixels. The processor 104 then assigns a color or other coding scheme to the determined blackbody temperatures and displays the color or coding scheme at display 106, thereby producing a thermal image of the object 108 at the display 106.

Each pixel is able to interact with light at a selected wavelength of the electromagnetic spectrum using plasmonic materials or material composed of plasmonic absorbers. Operation of these plasmonic absorbers is discussed below with respect to FIGS. 6-9. An exemplary plasmonic absorber includes carbon nanotube sections or segments which are discussed below with respect to FIGS. 6 and 7.

Figure 6:
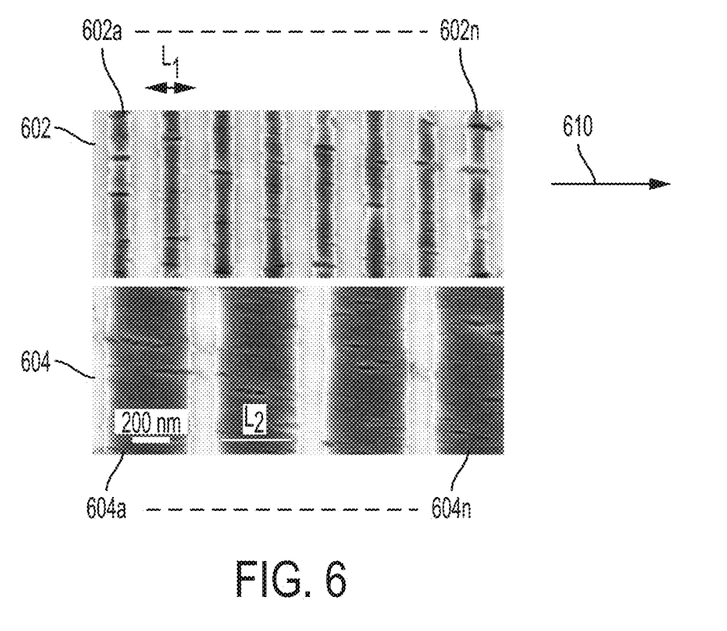
FIG. 6 shows a scanning electron micrograph of carbon nanotube (CNT) segments capable of measuring a radiance level using plasmonic interactions for use in a pixel of the focal plane array.

FIG. 6 shows a scanning electron micrograph of carbon nanotube (CNT) segments capable of measuring a radiance level using plasmonic interactions. Carbon nanotubes include carbon atoms that are arranged to form a cylindrical structure, generally on a nanoscale. FIG. 6 shows a first carbon nanotube in a top panel 602 and a second carbon nanotube in a bottom panel 604. The first carbon nanotube and the second carbon nanotube are each oriented so that their longitudinal axes extended in the direction of arrow 610. Each carbon nanotube has been sectioned by cutting the carbon nanotube in a plane perpendicular to the longitudinal axis, thereby creating CNT sections $602a, \ldots, 602n$ from the first carbon nanotube (shown as dark bands in top panel 602 and having length $L_1$) and creating CNT sections $604a, \ldots 604n$ from the second carbon nanotube (shown as dark bands in bottom panel 604 and having length $L_2$). These CNT sections can be in the form of ring.

A selected CNT section (e.g., CNT section 602a) is a plasmonic absorber and acts as a resonant cavity that serves to localize plasmons, with the ends of the CNT section functioning as plasmon reflectors. A plasmon resonance corresponds to a longitudinal charge oscillation that occurs between the ends of the CNT section. The resonance wavelength of the CNT section is proportional to the length of the CNT section. Therefore, CNT section 602a with length $L_1$ has different resonance wavelength that CNT section 604A with length $L_2$. Since $L_1 < L_2$ the resonance wavelength of CNT section 602a is less than the resonance wavelength of CNT section 604a. The resonance wavelength can also be tuned by changing such factors as the thickness of a film of the CNTs and the doping level of the CNTs. The CNT sections can be used to create a pixel of the focal plane array 200 that is sensitive to electromagnetic radiation at a specified wavelength.

Figure 7:
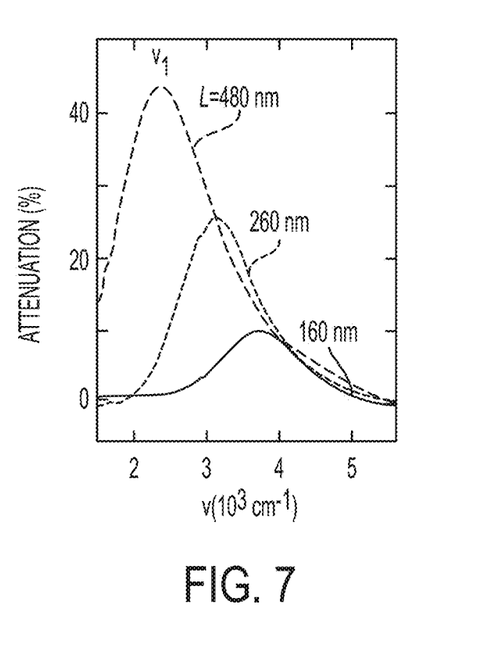
FIG. 7 shows a spectral responsiveness of CNT sections to electromagnetic radiation such as shown in FIG. 6, based on lengths of the CNT sections.

FIG. 7 shows a spectral responsiveness of CNT sections to electromagnetic radiation based on lengths of the CNT sections. Wavenumber in $10^3$ cm$^{-1}$ is shown along the abscissa and attenuation (%) is shown along the ordinate. The length of the CNT section indicates the resonance wavelength of the CNT, with resonance frequency and wavenumber being inversely proportional to the resonance wavelength. Thus a CNT section having length 160 nanometers (nms) has a peak absorption centered at a wavenumber of about 3800 cm$^{-1}$, a CNT section having length 260 nanometers (nms) has a peak absorption centered at a wavenumber of about 3000 cm$^{-1}$, and a CNT section having length 480 nanometers (nms) has a peak absorption centered a wavenumber of about 2400 cm$^{-1}$.

In alternate embodiments, other plasmonic materials, such as graphene nanoribbons or metal nanoparticles can be used in addition to or in place of CNT sections. The resonance wavelengths of these plasmonic materials can be tuned based on the geometry of the graphene nanoribbons or metal nanoparticles. The tunability of plasmonic materials can be used to make devices that allow plasmon resonances over a broad range of wavelengths. For instance, the plasmon resonances of carbon nanotubes and graphene nanoribbons can both span the mid-infrared through terahertz range, which is a suitable wavelength for thermographic cameras.

In various embodiments, the plasmonic absorber converts plasmonic interactions into electrical signals using at least one of the photothermoelectric effect, hot-electron tunneling, or a bolometric effect.

In the photothermoelectric effect, the plasmonic absorber is contacted on either side by metals. The two metals are of different materials and therefore have different work functions. In an exemplary embodiment, one metal is palladium and another metal is titanium. In this method, the plasmons absorb the incoming electromagnetic radiation, thereby heating the plasmonic material. The resulting temperature difference between the plasmonic material and the metal contacts creates an electrical voltage via the Seebeck effect. Because the two contact metals are different, the voltage of the two different contacts will be different, giving rise to a net voltage across the pixel. This voltage is recorded at the sensors and is then processed by the processor 104 to determine a power of the electromagnetic radiation.

In hot-electron tunneling, the plasmonic absorber is contacted by two different metals, similar to in the photothermoelectric effect. However, once the plasmons absorb the infrared radiation, and before the plasmons relax into thermal energy, the charges of the plasmonic absorber tunnel into the metal contacts, thereby producing an electrical current and voltage. The response time for hot-electron tunneling can be faster than the response time for the photothermoelectric effect. While for either of these processes (photothermoelectric effect and hot-electron tunneling) the pixel is the same, the process that ends up dominating will depend on the relaxation time of charges in the plasmonic absorber, and the characteristics of the electrical contacts to the plasmonic absorber.

In bolometry, a voltage is applied across the plasmonic absorber, and its conductance is measured. The conductance of the plasmonic absorber changes as a result of the heat created by the plasmonic absorption of the electromagnetic radiation. This change in conductance is measured by the voltmeter.

Figure 8:
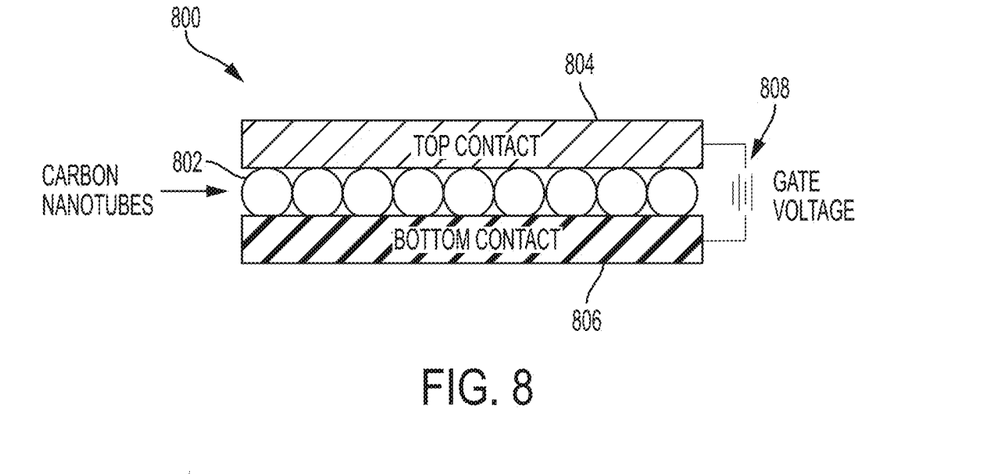
FIG. 8 shows a dynamically tunable pixel that can be used in a focal plane array of a thermographic camera in embodiments of the invention.

FIG. 8 shows a dynamically tunable pixel 800 that can be used in a focal plane array 200 of a thermographic camera 102 in another embodiment of the invention. The dynamically tunable pixel 800 includes a plasmonic material 802 sandwiched between a top contact 804 and bottom contact 806. The top contact 804 and bottom contact 806 are coupled to opposite ends of the plasmonic material and are further coupled to a voltage source 808 that applies a gate voltage across the plasmonic material 802. Since many plasmonic materials, such as graphene, carbon nanotubes, and GaAs, are semiconductors, the voltage can be treated as a gate voltage of a transistor, which dynamically tunes or selects the resonance wavelength of the plasmonic material 802 by the level of gate voltage.

Figure 9:
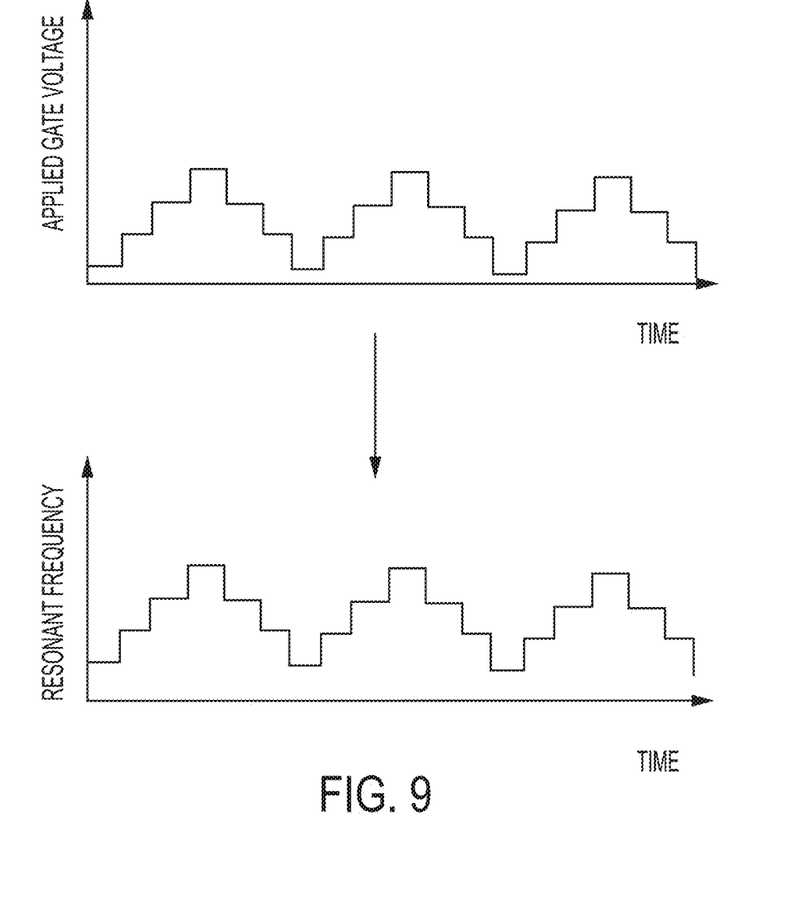
FIG. 9 shows an illustrative gate voltage that can be applied at the dynamically tunable pixel of a focal plane array and the resulting resonance frequency of a plasmonic material of the pixel corresponding to the gate voltage.

FIG. 9 shows an illustrative gate voltage that can be applied at the dynamically tunable pixel 800 and the resulting resonance frequency of the plasmonic material of the pixel corresponding to the gate voltage. The resonance frequency and resonance wavelength change with gate voltage in a controllable manner, allowing several radiance measurements to be obtained over a definable time interval at a single pixel. Therefore the gate voltage can be used to select a first resonance wavelength of the plasmonic material so that a radiance measurement can be obtained at the first resonance wavelength. The gate voltage can then be adjusted to select a second resonance wavelength of the plasmonic material so that a radiance measurement can be obtained at the second resonance wavelength.

Using dynamically tunable pixels, a superpixel need not have a plurality of pixels, and can instead having a single pixel that is swept over a range of sensitive wavelengths over a period of time. Measurements using this single pixel can be used to independently determine both ε and T using Eqs. (1) and (2) as well as the process illustrated in FIG. 5.

FIGS. 10-15 illustrate a fabrication process for the plasmonic focal plane array used in thermographic cameras for thermal imaging. For the sake of brevity, conventional techniques related to fabrication of focal plane arrays may or may not be described in detail herein. Moreover, the various tasks and process steps described herein can be incorporated into a more comprehensive procedure or process having additional steps or functionality not described in detail herein. In particular, various steps in the fabrication of focal plane arrays are well known and so, in the interest of brevity, many conventional steps will only be mentioned briefly herein or will be omitted entirely without providing the well-known process details.

Additionally, spatially relative terms, e.g., "beneath," "below," "lower," "above," "upper," and the like, are used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (e.g., rotated 90 degrees or at other orientations), and the spatially relative descriptors used herein should be interpreted accordingly.

Figure 10:
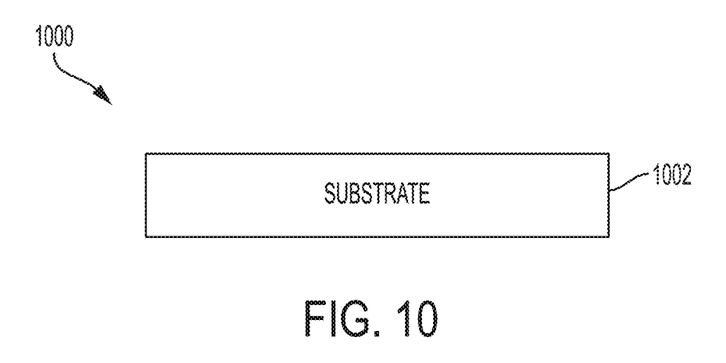
FIG. 10 shows a substrate of the focal plane array provided after an initial fabrication stage of a plasmonic focal plane array according to embodiments of the invention.
Figure 11:
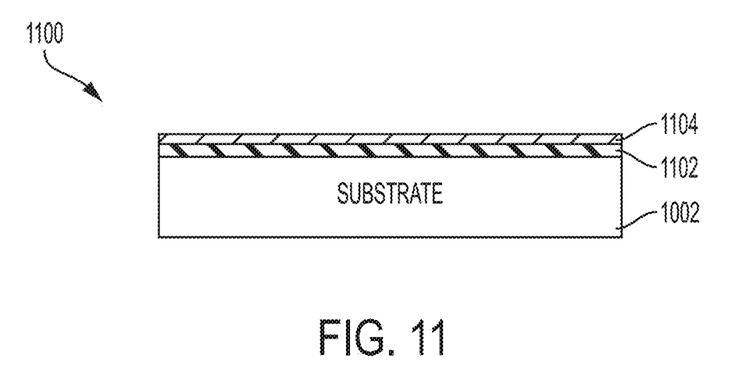
FIG. 11 shows a fabrication stage of the focal plane array according to embodiments of the invention.
Figure 12:
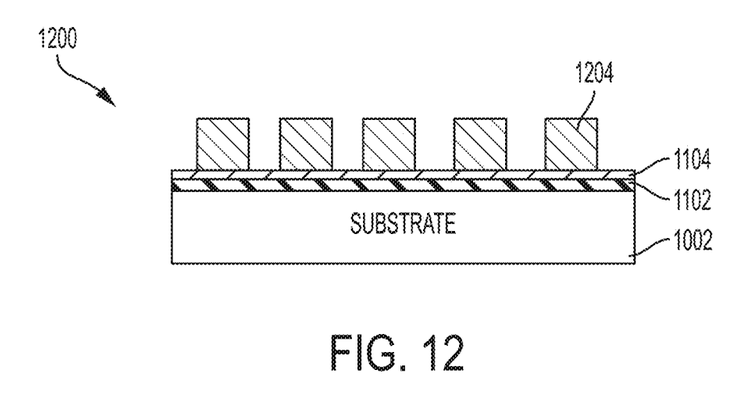
FIG. 12 shows a fabrication stage of the focal plane array according to embodiments of the invention.
Figure 13:
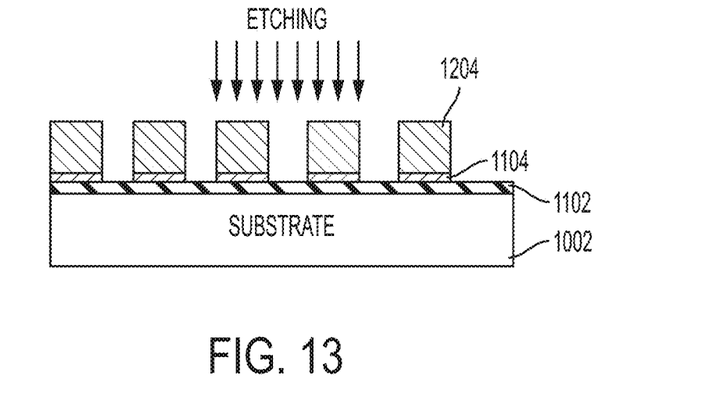
FIG. 13 shows a fabrication stage of the focal plane array according to embodiments of the invention.
Figure 14:
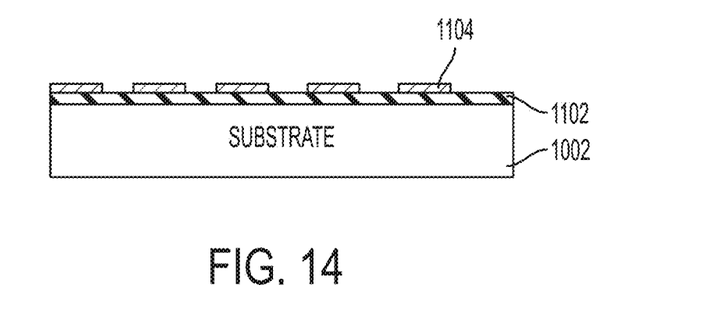
FIG. 14 shows a fabrication stage of the focal plane array according to embodiments of the invention.
Figure 15:
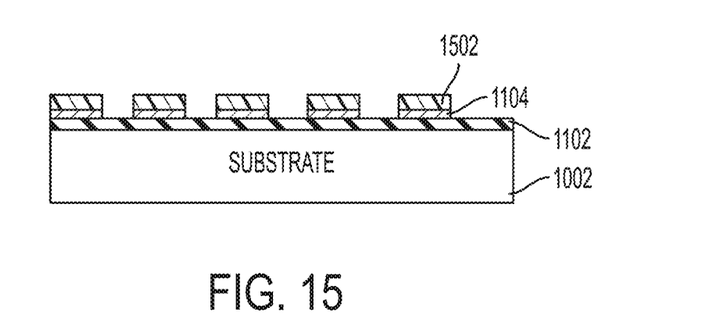
FIG. 15 shows a fabrication stage of the focal plane array according to embodiments of the invention.

FIG. 10 shows a substrate 1002 of the focal plane array provided in a fabrication stage 1000. FIG. 11 shows a stage 1100 in which the bottom metal layer 1102 is formed on top of the substrate 1002 by a suitable deposition method and a layer of plasmonic material 1104 is formed on top of and in direct contact with the bottom metal layer 1102. FIG. 12 shows a fabrication stage 1200 in which an etching mask 1204 is provided over the plasmonic material 1104. FIG. 13 shows a fabrication stage 1300 in which the plasmonic material 1104 is etching using a suitable lithography or etching process, such as reactive ion etching, for example. As part of this patterning process, multiple shapes of plasmonic particles or pixels can be created. FIG. 14 shows a fabrication stage 1400 in which the etch mask has been removed, leaving an array of pixels sensitive to a selected wavelength. FIG. 15 shows a fabrication stage 1500 in which the top metal contact 1502 is deposited on top of and in direct contact with the pixels in order to provide an electrical circuit from a bottom layer through to the top layer via the pixels. In various embodiments, the process of depositing plasmonic material and etching the plasmonic material can be repeated for plasmonic materials of difference resonance wavelengths in order to provide pixels having different resonance wavelengths.

Plasmonic materials can be grown or deposited, and can need to be patterned so as to properly tune their resonant frequencies. Several exemplary plasmonic materials can include silicon, GaAs, TiN, carbon nanotubes, graphene, other two dimensional metals, and bulk metals that have a low charge density.

Because the thermographic camera in embodiments of the present invention has pixels with different wavelength sensitivity, the thermographic camera can be used any selected wavelength regime, including mid infrared, far infrared, etc. This allows the thermographic camera to be used with very hot objects (e.g. missiles) typically have peak emission in the mid infrared and/or objects near room temperature have peak infrared in the far infrared.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of forming a thermal-based electronic image of an object, the method comprising:
receiving electromagnetic radiation emitted by the object at an optically sensitive layer including a superpixel having a plurality of pixels, wherein each pixel of the plurality of pixels includes a plasmonic absorber comprising graphene nanoribbons having a characteristic resonance wavelength and that generates a radiance measurement of the electromagnetic radiation at its characteristic resonance wavelength, the plasmonic absorber being disposed between a plurality of top contacts and a bottom contact layer, the plasmonic absorber in each of the plurality of pixels is respectively in direct contact with one top contact of the plurality of top contacts;
determining, at a processor, an emissivity and temperature for the electromagnetic radiation received at the superpixel using the radiance measurements obtained at the pixels of the superpixel; and
forming an image of the object from the determined emissivity and temperature.

2. The method of claim 1, further comprising applying a voltage to the pixel to change the resonance wavelength of the plasmonic absorber.

3. The method of claim 1, further comprising determining, at the processor, a radiance curve for the electromagnetic radiation from the radiance measurements.

4. The method of claim 1, further comprising generating voltage measurements indicated of the radiance measurements and determining the radiance curve from the voltage measurements.

5. The method of claim 1, wherein the plasmonic absorber is dynamically tunable to at least two resonance wavelengths via an applied voltage, wherein the radiance measurements are obtained at the plasmonic absorber at each of the at least two resonance wavelengths.

6. The method of claim 1, wherein the plurality of pixels includes a first pixel configured to measure radiance at a first resonance wavelength and a second pixel configured to measure radiance at a second resonance wavelength.

7. The method of claim 4, wherein the processor configured to:
receive the voltage measurement;
determine the emissivity and temperature of the electromagnetic radiation received at the superpixel from the voltage measurement; and
provide a color-coding for the superpixel at a display, the color-coding being based on the emissivity and temperature.

8. The method of claim 7, wherein the voltage measurement is indicative of a radiance level of the electromagnetic radiation received at the pixel at a selected resonance wavelength.

9. The method of claim 7, wherein the processor is further configured to determine a characteristic wavelength of a fitted emission curve.

10. The method of claim 9, wherein the processor is further configured to compare the fitted emission curve to a blackbody curve having a second characteristic wavelength that is same as the fitted emission curve in order to determine the emissivity and the temperature of the object.

11. A computer-implemented method of forming a thermal-based electronic image of an object, the method comprising:
receiving electromagnetic radiation emitted by the object at a layer of plasmonic material comprising graphene nanoribbons, the plasmonic material being disposed between a plurality of top contacts and a bottom contact layer, the plasmonic material in each of a plurality of pixels is respectively in direct contact with one top contact of the plurality of top contacts;
generating radiance measurements of the electromagnetic radiation at a plurality of wavelengths;
determining, at a processor, an emissivity and temperature of the object from the radiance measurements; and
forming a thermal-based electronic image of the object from the determined emissivity and temperature.

12. The method of claim 11, wherein the plasmonic material in at least one pixel of the plurality of pixels comprises a plasmonic absorber that is resonant at one of the plurality of wavelengths.

13. The method of claim 12, wherein the plasmonic material is dynamically tunable to a selected resonance wavelength.

14. The method of claim 12, further comprising applying a voltage to the at least one pixel to change a resonance wavelength of the plasmonic absorber.

15. The method of claim 11, further comprising determining, at the processor, a radiance curve for the electromagnetic radiation from the radiance measurements.

16. The method of claim 11, further comprising generating voltage measurements indicated of the radiance measurements and determining a radiance curve from the voltage measurements.

17. The method of claim 16, wherein the processor configured to:
receive the voltage measurement;
determine the emissivity and temperature of the electromagnetic radiation received at the at least one pixel of the plasmonic material from the voltage measurement; and
provide a color-coding for the at least one pixel of the plasmonic material at a display, the color-coding being based on the emissivity and temperature.

18. The method of claim 17, wherein the processor is further configured to determine a characteristic wavelength of a fitted emission curve.

19. The method of claim 18, wherein the processor is further configured to compare the fitted emission curve to a blackbody curve having a second characteristic wavelength that is same as the fitted emission curve in order to determine the emissivity and the temperature of the object.

* * * * *